United States Patent
Jia et al.

(10) Patent No.: US 8,154,663 B2
(45) Date of Patent: Apr. 10, 2012

(54) SYSTEM AND METHOD FOR ADAPTIVE CONTRAST ENHANCEMENT OF VIDEO SIGNALS

(75) Inventors: Yunwei Jia, Milton (CA); Bonaventure Karuta, Toronto (CA)

(73) Assignee: Sigma Designs, Inc., Milpitas, CA (US)

( * ) Notice: Subject to any disclaimer, the term of this patent is extended or adjusted under 35 U.S.C. 154(b) by 1486 days.

(21) Appl. No.: 11/653,521

(22) Filed: Jan. 16, 2007

(65) Prior Publication Data

US 2008/0170798 A1    Jul. 17, 2008

(51) Int. Cl.
*H04N 5/52* (2006.01)

(52) U.S. Cl. .......... 348/671; 348/678; 348/625; 382/274

(58) Field of Classification Search .................. 348/678, 348/671–673, 679, 683, 625, 687, 703; 382/274; 345/690; 358/461; *H04N 5/52*
See application file for complete search history.

(56) References Cited

U.S. PATENT DOCUMENTS

| | | | | |
|---|---|---|---|---|
| 5,963,665 A * | 10/1999 | Kim et al. | .................. | 382/169 |
| 7,102,695 B2 * | 9/2006 | Han et al. | .................. | 348/673 |
| 7,102,697 B2 | 9/2006 | Lei et al. | | |
| 7,221,408 B2 * | 5/2007 | Kim | .................. | 348/671 |
| 7,822,272 B2 * | 10/2010 | Lei | .................. | 382/168 |
| 2004/0036704 A1 | 2/2004 | Han et al. | | |
| 2005/0036071 A1 | 2/2005 | Kim | | |

OTHER PUBLICATIONS

International Search Report, dated Apr. 30, 2008 (2 pages).

* cited by examiner

*Primary Examiner* — Trang U Tran
(74) *Attorney, Agent, or Firm* — Jones Day

(57) ABSTRACT

A method for contrast enhancement of a video signal comprises receiving a video signal frame, gathering statistics about the video signal frame, calculating the effective input dynamic range of the video signal frame, calculating the effective output dynamic range of the video signal frame, and constructing a transform to enhance the picture in the video signal frame by mapping the effective input dynamic range to the effective output dynamic range via the transform.

29 Claims, 2 Drawing Sheets

SYSTEM AND METHOD FOR ADAPTIVE CONTRAST ENHANCEMENT OF VIDEO SIGNALS

BACKGROUND

1. Field

This invention relates to the field of video signal processing. More specifically, a video processing system and method is described in which the contrast of a video signal is adaptively enhanced while the temporal and spatial visual effects in the original video signal are preserved.

2. Related Art

The contrast of a picture is a property related to the luminance variations of the picture. Some pictures may have low contrast due to, for example, poor lighting conditions in the capturing process or a limited dynamic range of the image sensor used in the capturing process. It is well known that the human visual system is more sensitive to the contrast of a picture than the absolute luminance values. Therefore, contrast enhancement is often a necessary technique in many image processing applications.

Video can be thought of as a sequence of pictures captured at a certain picture rate. For example, NTSC video is at 60 fields/s, PAL video is at 50 fields/s, and ATSC 720 p video can be at 60 frames/s, etc. Contrast enhancement for video shares some common requirements with still picture contrast enhancement. For example, the purpose of both is to increase the visibility of the details in low-contrast areas, and the intensity ordering of neighboring pixels should be kept intact (i.e., if an original pixel X has a higher intensity level than one of its neighboring original pixels Y, then the contrast-enhanced enhanced pixel X' should have an intensity level not lower than the contrast-enhanced pixel Y'). On the other hand, due to the time-varying property of video, video contrast enhancement has different requirements from picture contrast enhancement. An important difference is that contrast variations, which commonly exist in video signals as the artistic intention of the producer, should be preserved after contrast enhancement. Two known examples of contrast variations in video are: (1) fade—where a video sequence gradually changes from one scene to another scene, often black or white, and (2) flash—where a sequence contains sudden intensity changes. Another important difference is that video contrast enhancement may need to be performed in real-time, i.e., at the same speed as the picture rate of the video signal. Due to these differences, directly applying still picture contrast enhancement methods to video signals often creates unrealistic and noticeable artifacts.

Therefore, a method of video contrast enhancement that enhances the contrast of a video signal while preserving the original visual effects is needed.

SUMMARY

A method for contrast enhancement of a video signal includes receiving a video signal frame of the video signal. Statistics are gathered about the video signal frame, and the effective input dynamic range and corresponding effective output dynamic range are calculated for the video signal frame. A transform is then constructed to enhance the contrast of the picture in the video signal frame by mapping the effective input dynamic range to the effective output dynamic range via the transform.

A video processing system for enhancing the contrast of a video signal includes a statistics gathering module, a knee-points calculation module, and an enhancement module. The statistics gathering module is configured to compute one or more measurements from a received video signal. The knee-points calculation module is configured to compute parameters for enhancing the received video signal based on the measurements computed by the statistics gathering module. The enhancement module is configured to map an input color component of the received video signal to an enhanced color component.

DETAILED DESCRIPTION OF THE DRAWINGS

Contrast enhancement may be achieved uniformly across a number of consecutive pictures in a video sequence, and therefore, the temporal visual effects in the original video sequence may be maintained. Also, contrast enhancement may be achieved proportionally across different effective intensity ranges in a picture, and therefore, the spatial visual effects in the original picture may be maintained.

Figure 1:
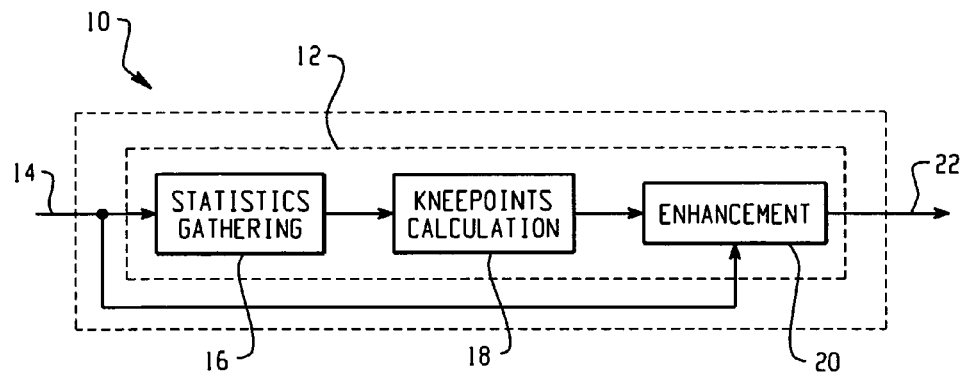
FIG. 1 is a block diagram of an example video processor.

FIG. 1 is a block diagram of an example video processor 10. The video processor includes an Adaptive Contrast Enhancement (ACE) module 12. The ACE module 12 includes a statistics gathering block 16, a knee-points calculation block 18 and an enhancement block 20.

The ACE module 12 can receive a video signal (for example, 10-bit RGB) as an input 14, and can output a video signal (for example, 10-bit RGB). The ACE module improves the contrast of the video sequence 14 by adapting its enhancement transform according to the statistics of each individual frame and its temporally-adjacent frames in the input sequence 14.

The statistics gathering block 16 can compute several measurements from the luma component of the input video signal 14. Among the measurements that can be computed by the statistics gathering block 16 are a histogram (hist), a cumulative distribution function of the histogram (cdf) and the mean value of luma (mean), for example.

The luma component of each pixel in an input frame can be approximated by the following equation:

$$Y = (5G + B + 2R + 4) >> 3,$$

where G, B, and R are the green, blue, and red components of the pixel, respectively, and ">>" stands for bit-right-shift operation. Closer approximations to ITU-601 or ITU-709 recommendations in the calculation of luma from G, B, and R may improve the performance of the ACE algorithm.

Other measurements made by the statistics gathering block 16 can be gathered from a measurement window over an input frame. The measurement window can be defined by several parameters that may be provided by a user. Among the parameters are the horizontal position of the measurement window, the horizontal size of the measurement window, the vertical position of the measurement window, and the vertical size of the measurement window.

The mean value of luma (mean) can be computed as the arithmetic average of all of the luma samples inside the measurement window over the input frame, as indicated by the following equation:

$$mean = \frac{\sum Y(j,i)}{measure\_v\_size \times measure\_h\_size},$$

where Y(j,i) is the luma value of the pixel at the j$^{th}$ row and i$^{th}$ column of the input frame, the summation is over all of the pixels in the measurement window, the measure_v_size is the vertical size of the measurement window, and the measure_h_size is the horizontal size of the measurement window. The division operation can be carried out during a vertical blanking interval of the video signal.

The histogram (hist) with a number of bins can be constructed from the luma samples in the measurement window. Each bin of the histogram corresponds to a number of continuous luma levels and can be represented by an integer. An example calculation for the histogram is given below, where the histogram consists of 128 bins and each bin represents 8 continuous luma levels:

$$hist[i]=0, i=0, \ldots, 127,$$

for each pixel (G, B, R):

$$iY=(5*G+B+2*R+4)>>3$$

$$hist[iY>>3]=hist[iY>>3]+1$$

The cumulative distribution function of the histogram (cdf) for each frame can be calculated as follows (using the above histogram hist as an example):

$$cdf[i] = \sum_{j=0}^{i} hist[j],$$

$$i = 0, 1, \ldots, 127.$$

The knee-points calculation block 18 can compute the enhancement parameters based on the statistics gathered from the block 16, and a number of user-provided parameters. The computations include a number of knee-points which will be used in constructing the enhancement transform.

The example video processor of FIG. 1 can achieve adaptive contrast enhancement while maintaining the transitional, temporal and spatial visual effects of the original video sequence. This contrast enhancement can be achieved by imposing constraints on the contrast enhancement transform according to the computations determined from the statistics gathering block 16 and the knee-points calculation block 18. Among the constraints that may be imposed are maintaining the mean or median of the intensity levels of a picture, scaling with the same factor the portions below and above the original mean in the effective input range of the picture, and scaling the effective dynamic range of consecutive input pictures by the same factor.

Figure 2:
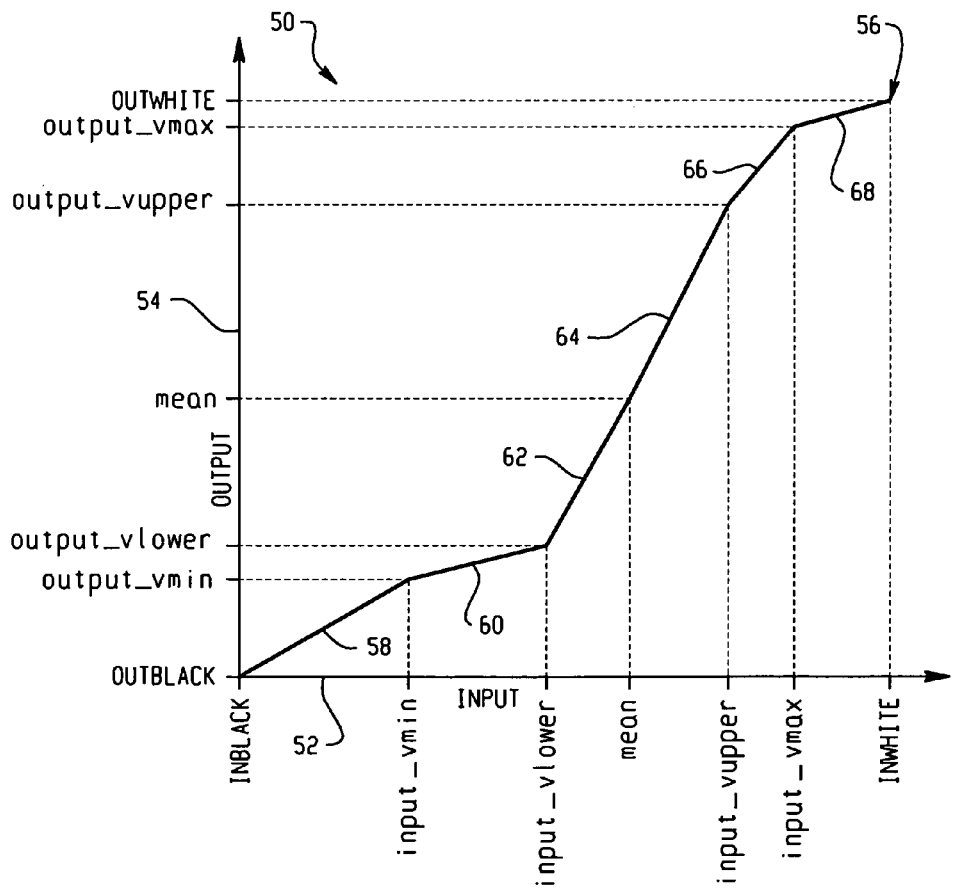
FIG. 2 is an example graph demonstrating input-output mapping by an Adaptive Contrast Enhancement algorithm.

FIG. 2 is an example graph 50 demonstrating input-output mapping by an Adaptive Contrast Enhancement algorithm. The dynamic range of the input video sequence 14 may be enhanced by an enhancement factor, which may be represented by an 8-bit unsigned fixed point number with four fractional bits in the range [1.0,15.9375]. It may be beneficial to enhance the frames in an input sequence 14 by a constant factor than to enhance them to the full displayable range.

The knee-points as demonstrated on the graph 50 in FIG. 2 as the points between the graph 56 sections 58, 60, 62, 64, 66, and 68 can be calculated in several ways. For the points indicated on the x-axis 52 of graph 50 as INBLACK and INWHITE, two fixed constants that specify the black level and white level of the input video 14 can be used; for example, they can be set to 0 and 1023, respectively, if the input video 14 is a 10-bit video sequence.

The points indicated on the y-axis 54 at OUTBLACK and OUTWHITE can also be set to the black level and white level that can be displayed on a target device; for example, they can be set to 0 and 1023, respectively, if the target device can display a 10-bit video sequence. Therefore, in such cases, the point [INBLACK, OUTBLACK]=[0,0], and the point [INWHITE, OUTWHITE]=[1023, 1023].

The points indicated on the graph 50 as input_vmin and input_vmax specify the effective input dynamic range that is to be enhanced by the adaptive contrast enhancement method. They can be calculated from the gathered statistics and some user provided parameters, in a way illustrated below via an example.

Let the input video signal 14 be 10-bit video, and let cdf and mean be the statistics calculated as described previously. Let N be the total number of pixels in the measurement window, such that:

$$N=measure\_h\_size*measure\_v\_size,$$

where measure_h_size is the horizontal size of the measurement window and measure_v_size is the vertical size of the measurement window. Next, let cdf_low and cdf_high be two user provided parameters in the range of $\{0,1,\ldots,255\}$. Let $c_1$ be an integer greater than or equal to 0 and less than or equal to 127, so that the following condition is satisfied:

$$cdf[c_1-1]*256 < N*cdf\_low \leq 256*cdf[c_1],$$

where cdf[−1]=0 conceptually. Then, input_vmin can be calculated as $$input\_vmin=min(c_1*8, mean).$$

If we next let $c_2$ be an integer greater than or equal to zero and less than or equal to 127, so that the following condition is satisfied:

$$cdf[c_2-1]*256 \leq N*cdf\_high < 256*cdf[c_2],$$

then input_vmax can be calculated as $$input\_vmax=max(c_2*8, mean).$$

A method of calculating the values of input_vmax and input_vmin is also demonstrated in the following code segment:

```
N = measure_h_size * measure_v_size;
count = 0;
while(cdf[count] * 256 < N * cdf_low){
    count = count + 1;
}
input_vmin = min(count * 8, mean);
count = 127;
while(cdf[count] * 256 > N * cdf_high){
    count = count − 1;
    if(count < 0) break;
}
input_vmax = max((count + 1) * 8, mean);
```

The points indicated on the y-axis 54 as output_vmax and output_vmin determine the effective output dynamic range after contrast enhancement. These points can be calculated by the following method (where ace_factor is the enhancement factor that can be specified by the user):

```
1)  if      mean − ace_factor*(mean − input_vmin) < OUTBLACK
2)      or mean + ace_factor*(input_vmax − mean) > OUTWHITE
3)          if (mean − OUTBLACK)*(input_vmax − mean) ≦ (mean − input_vmin)*(OUTWHITE − mean)
4)              output_vmin = OUTBLACK 5)              output_vmax = mean + (input_vmax − mean) * (mean − OUTBLACK)
                                      ─────────────────────────────────────
                                              mean − input_vmin 6)          else
7)              output_vmax = OUTWHITE 8)              output_vmin = mean + (mean − input_vmin) * (OUTBLACK − mean)
                                      ─────────────────────────────────────
                                              input_vmax − mean 9)  else
10)     output_vmin = mean − ace_factor * (mean − input_vmin)
11)     output_vmax = mean + ace_factor * (input_vmax − mean)
```

When the available output range is large enough to achieve the specified enhancement factor, the following may be true:

$$\frac{\text{output\_vmax} - \text{output\_vmin}}{\text{input\_vmax} - \text{input\_vmin}} = \text{ace\_factor}.$$

That is, the dynamic range is enlarged by a factor of ace_factor. When this equality cannot be maintained due to a limited output range, the output dynamic range can be spread around the mean in the same proportion as the input dynamic range is spread around the mean. That is, $$\frac{\text{output\_vmax} - \text{mean}}{\text{mean} - \text{output\_vmin}} = \frac{\text{input\_vmax} - \text{mean}}{\text{mean} - \text{input\_vmin}}.$$

The enhancement factor in the second "if" case (line 3 to line 5 in the code segment) demonstrated in the calculations above is given by:

$$\frac{\text{output\_vmax} - \text{output\_vmin}}{\text{input\_vmax} - \text{input\_vmin}} = \frac{\text{mean} - OUTBLACK}{\text{mean} - \text{input\_vmin}}.$$

Further, in the first "else" case (line 6 to line 8 in the code segment) demonstrated in the calculations above, the enhancement factor is given by:

$$\frac{\text{output\_vmax} - \text{output\_vmin}}{\text{input\_vmax} - \text{input\_vmin}} = \frac{OUTWHITE - \text{mean}}{\text{input\_vmax} - \text{mean}}.$$

Because OUTBLACK is less than or equal to input_vmin, and OUTWHITE is greater than or equal to input_vmax, the achieved enhancement factors are at least one.

The remaining parameters on the graph 50, input_vlower and input_vupper on the x-axis 52, and output_vupper and output_vlower on the y-axis 54 can be calculated from user provided parameters in the following way:

input_vlower=[(mean−input_vmin)*input_low+64]>>7+input_vmin, output_vlower=[(mean−output_vmin)*output_low+64]>>7+output_vmin, input_vupper=[(input_vmax−mean)*input_high+64]>>7+mean, output_vupper=[(output_vmax−mean)*output_high+64]>>7+mean.

In the above, input_low, input_high, output_low and output_high can be user provided parameters in the range $\{0,1,2,\ldots,127\}$.

When these parameters are calculated, they satisfy the following two conditions:

INBLACK≦input_vmin≦
  input_vlower≦mean≦input_vupper≦
  input_vmax≦INWHITE,

OUTBLACK≦output_vmin≦
  output_vlower≦mean≦
  output_vupper≦output_vmax≦OUTWHITE.

The result of these calculations is that the contrast enhancement can be accomplished by stretching the effective input dynamic range (i.e., [input_vmin, input_vmax]) to the effective output dynamic range (i.e., [output_vmin, output_vmax]) for each frame in the input video sequence 14. When values are in the range [INBLACK, input_vmin], they can be mapped to the range [OUTBLACK, output_vmin] via a linear ramp, and when values are in the range [input_vmax, INWHITE], they can be mapped to the range [output_vmax, OUTWHITE] via a linear ramp.

The enhancement block 20 (in FIG. 1) maps an input color component of the video sequence 14 to an enhanced color component. The enhancement to a frame in the input video sequence 14 can be based on statistics collected from either the current frame or the previous frames in the input sequence 14. This stage consists of mapping each input color component of a pixel to an output color component according to the graph in FIG. 2. The same mapping may be used for the three color components (R, G, B) of a pixel separately. Example calculations that can be used in the mapping are explained below.

Let comp be an input color component of a pixel. If comp is less than or equal to input_vmin, falling within graph segment 58, then:

```
if(input_vmin = INBLACK)
        result = OUTBLCACK
else
        result = OUTBLACK + (comp – INBLACK) * (output_vmin – OUTBLACK) / (input_vmin – INBLACK).
```

If comp is greater than input_vmin and less than or equal to input_vlower, falling in graph segment 60, then:

result = output_vmin + $\frac{(comp - input\_vmin) * (output\_vlower - output\_vmin)}{input\_vlower - input\_vmin}$.

If comp is greater than input_vlower and less than or equal to input_vupper, falling within graph segments 62 or 64, then:

result = output_vlower + $\frac{(comp - input\_vlower) * (output\_vupper - output\_vlower)}{input\_vupper - input\_vlower}$.

If comp is greater than input_vupper and less than or equal to input_vmax, falling within graph segment 66, then:

result = output_vupper + $\frac{(comp - input\_vupper) * (output\_vmax - output\_vupper)}{input\_vmax - input\_vupper}$.

Finally, if comp is greater than input_vmax, therefore falling within graph segment 68, then:

```
if(input_vmax = INWHITE)
        result = OUTWHITE
else
        result = output_vmax + (comp – input_vmax) * (OUTWHITE – output_vmax) / (INWHITE – input_vmax).
```

If the three color components of a pixel (R,G,B) are not enhanced with the same proportion, there may be some change of the hue of certain colors. An example method to alleviate this is as follows. Let $(R_i, G_i, B_i)$ be an input pixel, and $Y_i$ be its luma. f( ) is the mapping curve constructed from the histogram, such as the graph 56 in FIG. 2. Then:

$c = f(Y_i)/Y(i)$, $R_o = R_i * c$, $G_o = G_i * c$, $B_o = B_i * c$.

$(R_o, G_o, B_o)$ is the output pixel corresponding to the input pixel. The output pixel will have a luma equal to $c * Y_i$.

A second example method to alleviate the situation discussed above involves mapping $(R_i, G_i, B_i)$ to $(R_o, G_o, B_o)$ in the following manner:

$c = f(Y_i)/Y(i)$, $R_o = (c*(R_i+Y_i) + R_i - Y_i)/2$, $G_o = (c*(G_i+Y_i) + G_i - Y_i)/2$, $B_o = (c*(B_i+Y_i) + B_i - Y_i)/2$.

Figure 3:
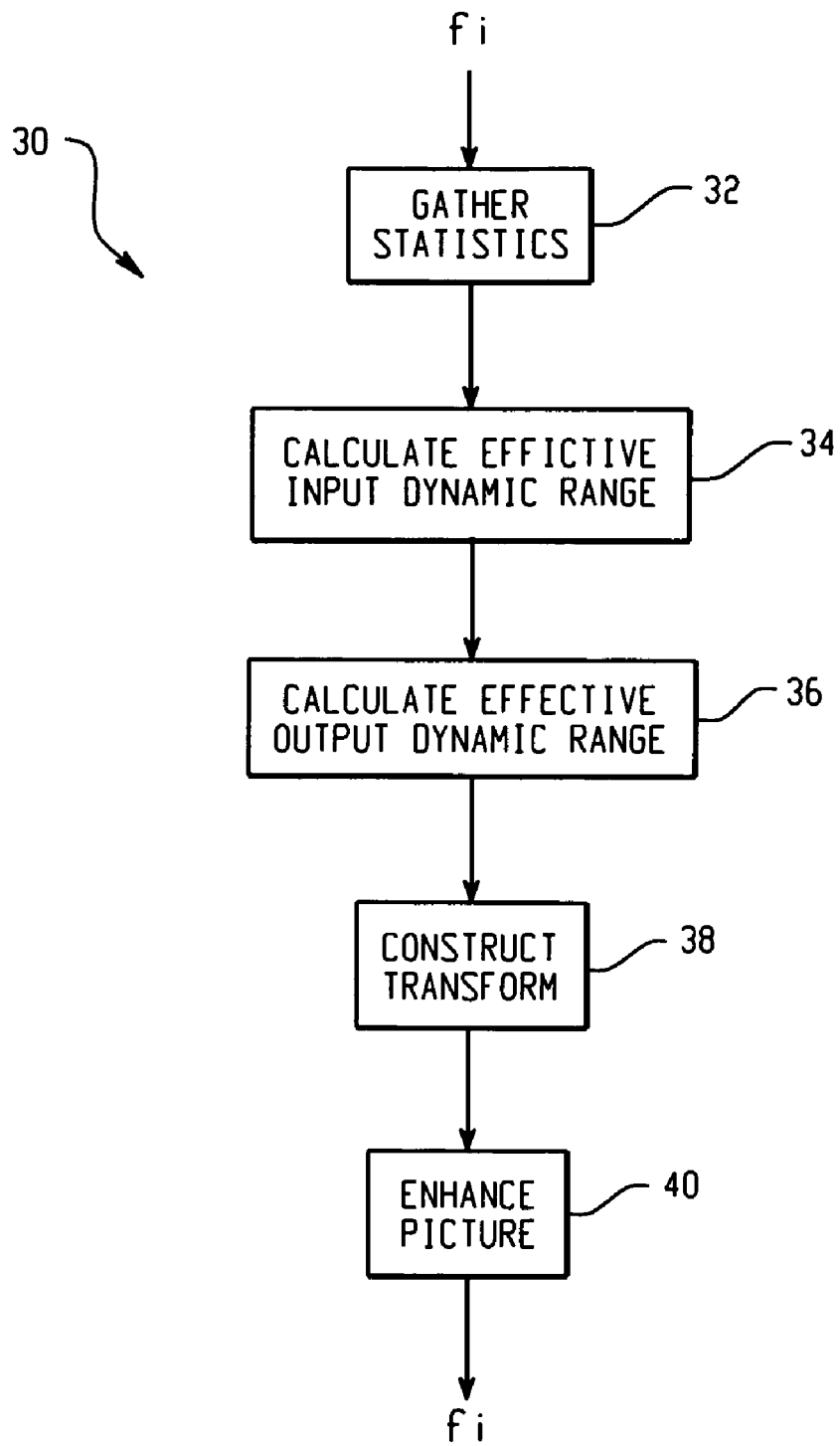
FIG. 3 is a flow chart of an example method of implementing an Adaptive Contrast Enhancement algorithm.

FIG. 3 is a flow chart 30 of an example method of implementing an Adaptive Contrast Enhancement Algorithm. The method begins at step 32 where the system receives a video signal $f_i$. The input video signal $f_i$ is the video image that is to be enhanced. In step 32, the statistics necessary for later calculations are collected. Among the statistics that may be gathered are the luma component of a pixel, the measurement window parameters, the mean value of luma, a histogram, and the cumulative distribution function of the histogram. Other statistical measurements may be made as well.

After the statistics are gathered in step 32, the method moves to step 34 where the effective input dynamic range is calculated. The effective input dynamic range may be specified by a user, but is ultimately the range where the contrast is to be enhanced. The range may be chosen, for example, based on the range where the majority of picture details are contained, where pixels outside of the range are not distinguishable to the human visual system, or where pixels outside of the range are noise corrupted.

The input dynamic range calculated in step 34 may be specified in terms of percentiles of the cumulative distribution function (CDF), in terms of intensity levels, or according to combined logic on CDF, the intensity levels and user defined logic. The effective input dynamic range may vary from picture to picture.

After the effective input dynamic range is calculated, the effective output dynamic range is calculated in step 36. The effective output dynamic range is calculated by mapping the effective input dynamic range to a range via a transform, which is determined in step 38. The effective output dynamic range and the transform from the input dynamic range to the output dynamic range may be determined to satisfy constraints to achieve contrast enhancement while maintaining key visual effects. Among the visual effects that may be maintained after contrast enhancement are the mean intensity level or median intensity level of a picture, the spatial trend of intensity variations of a picture, or the temporal trend of intensity variations of consecutive pictures. In step 40, the picture is enhanced to produce the enhanced video signal $f_i'$.

If $[L_i, H_i]$ is the effective input dynamic range, and $[L_i', H_i']$ is the output dynamic range, then the transform F in step 38 may be constructed to satisfy the following conditions:

$$F(L_i)=L_i',$$

$$F(MEAN_i)=MEAN_i', \text{ and}$$

$$F(H_i)=H_i'.$$

The user may specify the function type F. An example of the function F is the graph 50 shown in FIG. 2.

In another example embodiment, k is a user-specified enhancement factor. In this embodiment, the effective output dynamic range can be calculated in the following way:

$$L_i'=MEAN_i-k*(MEAN_i-L_i)$$

$$H_i'=MEAN_i+k*(H_i-MEAN_i).$$

In another example embodiment, if the two constraints in the equations above cannot be satisfied, the effective output range may be calculated in such a way so that the dynamic range is spread around $MEAN_i$ in the same proportion as the input dynamic range spread around $MEAN_i$. For example, $L_i'$ and $H_i'$ may be required to satisfy the following condition:

$$\frac{H_i'-MEAN_i}{MEAN_i-L_i'}=\frac{H_i-MEAN_i}{MEAN_i-L_i}.$$

$MEAN_i$ may be replaced by $MED_i$ (the median of the luma values) or other statistics gathered in step 32 in any of the equations above.

In another example embodiment, the input effective range may be further partitioned into a number of sub-ranges and separate transforms may be applied to the sub-ranges. In this case, it may be preferable to partition the input effective range symmetrically around the $MEAN_i$ or $MED_i$ and apply functions with the same shape to two symmetrical sub-ranges.

In another example method, one transform may be used to map the intensity levels from $[InBlack, L_i]$ to $[OutBlack, L_i']$ and another transform may be used to map the intensity levels from $[H_i, InWhite]$ to $[H_i', OutWhite]$. In this case, InBlack and InWhite are the black level and white level of the input video, and OutBlack and OutWhite are the black level and white level of the output video.

As one example embodiment, if the intensity levels of the pictures in a sequence are not directly available in the original color space, the original color space can be converted to an intermediate color space which is expressed in terms of a function of intensity. The intermediate color spaces can include, but are not limited to YCbCr, YUV, YPbPr, HSV (Hue, Saturation, Value), and HSI (Hue, Saturation, Intensity). Contrast enhancement can then be performed in the intermediate color space according to the described method above, and then the color space can be converted to the original color space for the enhanced video signal.

Because the transform function F is based on intensity levels, if it directly applied to each of the color components of an RGB picture, color shift may occur to some pixels in the picture because the three color components of a pixel may not be enhanced with the same proportion. To avoid this, the function F may be normalized against intensity levels and then applied to each of the color components.

An example method of normalizing F against intensity levels is demonstrated below. Let $(R_i, G_i, B_i)$ be an input pixel, and $Y_i$ be the pixel's intensity level. Instead of applying F directly to the components of the input pixel, the following calculations may be performed:

$$c=F(Y_i)/Y_i,$$

$$R_o=R_i*c,$$

$$G_o=G_i*c,$$

$$B_o=B_i*c,$$

where $(R_o, G_o, B_o)$ is the output pixel corresponding to the input pixel. With these calculations, the output pixel can have an intensity level equal to $F(Y_i)$.

Another example of calculations that can be used to achieve contrast enhancements without causing color shift is demonstrated below:

$$c=F(Y_i)/Y_i,$$

$$R_o=(c*(R_i+Y_i)+R_i-Y_i)/2,$$

$$G_o=(c*(G_i+Y_i)+G_i-Y_i)/2,$$

$$B_o=(c*(B_i+Y_i)+B_i-Y_i)/2.$$

As demonstrated above, the video processor can achieve adaptive contrast enhancement while maintaining the transitional, temporal and spatial visual effects of the original video sequence. This contrast enhancement can be achieved by imposing constraints on the contrast enhancement transform according to calculations made based on statistics gathered from input video images.

This written description uses examples to disclose the invention, including the best mode, and also to enable a person skilled in the art to make and use the invention. The patentable scope of the invention may include other examples that occur to those skilled in the art.

It is claimed:

1. A method for contrast enhancement of a video signal, comprising:

receiving a video signal frame of the video signal;

gathering statistics about the video signal frame;

calculating the effective input dynamic range of the video signal frame;

calculating the effective output dynamic range of the video signal frame; and constructing a transform to enhance the picture in the video signal frame by mapping the effective input dynamic range to the effective output dynamic range via the transform;

wherein the effective output dynamic range is calculated in one of the following ways:

$$L_i'=MEAN_i-k*(MEAN_i-L_i),$$

$$H_i'=MEAN_i+k*(H_i-MEAN_i), \qquad \text{i)}$$

where $[L_i, H_i]$ is the effective input dynamic range, $[L_i', H_i']$ is the effective output dynamic range, $MEAN_i$ is the mean value of luma, and k is an enhancement factor;

$$L_i'=MED_i-k*(MED_i-L_i),$$

$$H_i'=MED_i+k*(H_i-MED_i), \qquad \text{ii)}$$

where $[L_i, H_i]$ is the effective input dynamic range, $[L_i', H_i']$ is the effective output dynamic range, $MED_i$ is the median of luma values of the received video frame, and k is an enhancement factor;

iii)

$$\frac{H'_i - MEAN_i}{MEAN_i - L'_i} = \frac{H_i - MEAN_i}{MEAN_i - L_i},$$

where [$L_i$,$H_i$] is the effective input dynamic range, [$L_i$', $H_i$'] is the effective output dynamic range, and $MEAN_i$ is the mean value of luma; or iv)

$$\frac{H'_i - MED_i}{MED_i - L'_i} = \frac{H_i - MED_i}{MED_i - L_i},$$

where [$L_i$,$H_i$] is the effective input dynamic range, [$L_i$', $H_i$'] is the effective output dynamic range, and $MED_i$ is the median of luma values of the received video signal frame.

2. The method of claim 1, wherein the gathering step includes gathering statistics from the group of: the luma component of a pixel, the measurement window parameters, the mean value of luma values, the median value of the luma values, a histogram of the luma values, and the cumulative distribution function of the histogram.

3. The method of claim 1, wherein the effective input dynamic range of the video signal frame is specified by a user.

4. The method of claim 1, wherein the effective input dynamic range of the video signal frame is calculated in terms of percentiles of a cumulative distribution function provided by the gathering step.

5. The method of claim 1, wherein the effective input dynamic range of the video signal frame is calculated in terms of intensity levels.

6. The method of claim 1, wherein the effective input dynamic range of the video signal frame is calculated in terms of a cumulative distribution function provided by the gathering step and in terms of intensity levels.

7. The method of claim 1, wherein the transform is constructed to satisfy the following conditions:

$F(L_i)=L_i'$, $F(MEAN_i)=MEAN_i$, $F(H_i)=H_i'$, where [$L_i$,$H_i$] is the effective input dynamic range, [$L_i$',$H_i$'] is the effective output dynamic range, and $MEAN_i$ is the mean value of luma.

8. The method of claim 1, wherein the transform is constructed to satisfy the following conditions:

$F(L_i)=L_i'$, $F(MED_i)=MED_i$, $F(H_i)=H_i'$, where [$L_i$,$H_i$] is the effective input dynamic range, [$L_i$',$H_i$'] is the effective output dynamic range, and $MED_i$ is the median of luma values of the received video signal frame.

9. The method of claim 1, wherein the enhancement factor is specified by a user.

10. The method of claim 1, wherein the enhancement factor k is maintained as a constant over consecutive frames.

11. The method of claim 1, wherein the effective output dynamic range is calculated by partitioning the effective input dynamic range into a plurality of sub-ranges and applying separate transforms to each of the plurality of sub-ranges.

12. The method of claim 11, wherein the partitioning is performed symmetrically around the mean or median of the luma values of the received video signal frame.

13. The method of claim 12, wherein the transform is applied to two symmetrical sub-ranges having the same shape.

14. A video processing system for enhancing the contrast of a video signal, comprising:
a statistics gathering module for computing one or more measurements from a received video signal,
a knee-points calculation module for computing parameters for enhancing the received video signal based on the measurements computed by the statistics gathering module, and
an enhancement module, for mapping an input color component of the received video signal to an enhanced color component;
wherein the contrast enhancement for the picture is accomplished by stretching an effective input dynamic range to an effective output dynamic range for each frame in the received video signal;
wherein the effective output dynamic range is calculated in one of the following ways:

$L_i'=MEAN_i-k*(MEAN_i-L_i)$, $H_i'=MEAN_i+k*(H_i-MEAN_i)$,    i)

where [$L_i$,$H_i$] is the effective input dynamic range, [$L_i$', $H_i$'] is the effective output dynamic range, $MEAN_i$ is the mean value of luma, and k is an enhancement factor;

$L_i'=MED_i-k*(MED_i-L_i)$, $H_i'=MED_i+k*(H_i-MED_i)$,    ii)

where [$L_i$,$H_i$] is the effective input dynamic range, [$L_i$', $H_i$'] is the effective output dynamic range, $MED_i$ is the median of luma values of the received video frame, and k is an enhancement factor;

iii)

$$\frac{H'_i - MEAN_i}{MEAN_i - L'_i} = \frac{H_i - MEAN_i}{MEAN_i - L_i},$$

where [$L_i$,$H_i$] is the effective input dynamic range, [$L_i$', $H_i$'] is the effective output dynamic range, and $MEAN_i$ is the mean value of luma; or iv)

$$\frac{H'_i - MED_i}{MED_i - L'_i} = \frac{H_i - MED_i}{MED_i - L_i},$$

where [$L_i$,$H_i$] is the effective input dynamic range, [$L_i$', $H_i$'] is the effective output dynamic range, and $MED_i$ is the median of luma values of the received video signal frame.

15. The video processing system of claim 14, wherein the measurements include the mean value of luma.

16. The video processing system of claim 14, wherein the knee-points calculation module is configured to determine a plurality of knee-points for the received video signal.

17. The video processing system of claim 14, wherein the knee-points calculation module is further configured to determine a measurement window for the received video signal.

18. The video processing system of claim 14, wherein the parameters of a measurement window are user provided.

19. The video processing system of claim 16, wherein one or more of the knee-points are determined from the black level and the white level of the received video signal, and the black level and white level of a target display device.

20. The video processing system of claim 17, wherein one or more of the knee-points are calculated from user-specified percentiles in a cumulative distribution function of the luma values of the received video signal frame.

21. The video processing system of claim 14, wherein the stretching is achieved with the constraint that the luma mean of the enhanced video signal frame is the same as that of the received video signal frame.

22. The video processing system of claim 14, wherein the stretching is achieved with the constraint that the luma median of the enhanced video signal frame is the same as that of the received video signal frame.

23. The video processing system of claim 14, wherein the stretching is achieved with the constraint that the ratio between the effective output dynamic range and the effective input dynamic range is maintained constant over a number of consecutive frames.

24. The video processing system of claim 14, wherein the stretching is achieved with the constraint that the spread of the effective output dynamic range around the luma mean of the output video signal frame is the same as the spread of the effective input dynamic range around the luma mean of the received video signal frame.

25. The video processing system of claim 14, wherein the stretching is achieved with the constraint that the spread of the effective output dynamic range around the luma median of the output video signal frame is the same as the spread of the effective input dynamic range around the luma median of the received video signal frame.

26. The video processing system of claim 14, wherein for the input pixels outside the effective input dynamic range, a transform is used to map the intensity levels lower than the input dynamic range to intensity levels lower than the output dynamic range, and another transform is used to map the intensity levels higher than the input dynamic range to intensity levels higher than the output dynamic range.

27. The video processing system of claim 14, wherein the enhancement block is configured to enhance the input video sequence based on statistics collected from a previous frame in the received video signal.

28. The video processing system of claim 14, wherein the same mapping is used for the three color components (R,G,B) separately.

29. The video processing system of claim 14, wherein a mapping is calculated from the luma values of a received video frame, a coefficient is calculated for each pixel in the received video frame according to the mapping and the luma value of the pixel, and the same coefficient is applied to the three color components (R, G, B) of the pixel during the enhancement.

* * * * *